US012296861B2

(12) United States Patent
Kawano et al.

(10) Patent No.: US 12,296,861 B2
(45) Date of Patent: May 13, 2025

(54) VEHICLE CONTROL DEVICE, MEDIUM FOR STORING COMPUTER PROGRAM FOR VEHICLE CONTROL, AND METHOD FOR CONTROLLING VEHICLE

(71) Applicant: TOYOTA JIDOSHA KABUSHIKI KAISHA, Toyota (JP)

(72) Inventors: Takahiro Kawano, Tokyo-to (JP); Ryuta Hashimoto, Tokyo-to (JP); Takahiro Seta, Yokohama (JP); Kota Harada, Tokyo-to (JP); Yuki Mori, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 267 days.

(21) Appl. No.: 17/656,317

(22) Filed: Mar. 24, 2022

(65) Prior Publication Data

US 2022/0306162 A1   Sep. 29, 2022

(30) Foreign Application Priority Data

Mar. 24, 2021   (JP) .................................. 2021-049837

(51) Int. Cl.
*B60W 60/00*   (2020.01)
*B60W 50/14*   (2020.01)

(52) U.S. Cl.
CPC ........ *B60W 60/0053* (2020.02); *B60W 50/14* (2013.01); *B60W 2552/05* (2020.02); *B60W 2556/40* (2020.02)

(58) Field of Classification Search
CPC ............. B60W 60/0053; B60W 50/14; B60W 2552/05; B60W 2556/40; B60W 2556/50; B60W 30/18163
See application file for complete search history.

(56) References Cited

U.S. PATENT DOCUMENTS 11,034,361 B2 *   6/2021   Boss ................. B60W 50/0097
11,137,760 B2 *   10/2021   Latotzki ................... G05D 1/81
(Continued)

FOREIGN PATENT DOCUMENTS

JP   2016028927 A   3/2016
JP   2019127194 A   8/2019
(Continued)

*Primary Examiner* — Abdalla A Khaled
(74) *Attorney, Agent, or Firm* — Dickinson Wright, PLLC (57) ABSTRACT

A vehicle control device has a processor configured to determine whether or not there exists a branching location where the vehicle is to exit from the traveling in a predetermined driving zone of a navigation route and, when a branching location exists, to determine whether or not a control transfer request zone exists in which the driver is to be given a request to transfer driving of the vehicle from automatic control to manual control, within a first distance on the branching road from the branching location, or a second distance on the traveling road from the branching location in the traveling direction of the vehicle, and when the control transfer request zone exists, to notify the driver via a notification unit, before the vehicle reaches the branching location, that the vehicle is to be moved from the traveling road to the branching road by manual control.

7 Claims, 8 Drawing Sheets

(56) References Cited

U.S. PATENT DOCUMENTS

| | | | |
|---|---|---|---|
| 11,613,263 B2* | 3/2023 | Hasegawa | B60K 28/10 |
| | | | 701/29.2 |
| 2015/0353088 A1* | 12/2015 | Ishikawa | B60W 50/082 |
| | | | 701/23 |
| 2016/0033964 A1* | 2/2016 | Sato | G05D 1/0274 |
| | | | 701/24 |
| 2016/0347327 A1* | 12/2016 | Kondo | B60W 50/08 |
| 2017/0197635 A1* | 7/2017 | Sato | B60W 60/0059 |
| 2017/0203770 A1 | 7/2017 | Kondo | |
| 2018/0128635 A1* | 5/2018 | Nakamura | B60W 30/18163 |
| 2018/0162396 A1* | 6/2018 | Ibuka | G08G 1/096775 |
| 2018/0329414 A1* | 11/2018 | Igarashi | B60W 50/082 |
| 2019/0025825 A1* | 1/2019 | Takahama | B60W 30/16 |
| 2019/0227544 A1 | 7/2019 | Aoki et al. | |
| 2019/0243360 A1* | 8/2019 | Uetani | B60W 50/082 |
| 2019/0243362 A1* | 8/2019 | Hyuga | B60W 30/00 |
| 2019/0248382 A1* | 8/2019 | Hashimoto | B60W 60/0053 |
| 2019/0294163 A1* | 9/2019 | Ueno | B60W 30/18 |
| 2019/0317506 A1* | 10/2019 | Ishioka | B60W 50/10 |
| 2019/0367034 A1* | 12/2019 | Okajima | B60W 60/00 |
| 2020/0231158 A1* | 7/2020 | Okuyama | B60W 60/0054 |
| 2020/0239027 A1* | 7/2020 | Watanabe | B60W 50/14 |
| 2020/0307579 A1* | 10/2020 | Mizoguchi | B62D 15/0255 |
| 2020/0307593 A1* | 10/2020 | Hirosawa | B60W 10/04 |
| 2021/0197845 A1* | 7/2021 | Mimura | G06F 3/013 |
| 2022/0194433 A1* | 6/2022 | Nagata | G08G 1/0969 |
| 2022/0306116 A1* | 9/2022 | Hashimoto | B60W 30/18163 |

FOREIGN PATENT DOCUMENTS

| | | |
|---|---|---|
| JP | 2020119269 A | 8/2020 |
| JP | 2021039540 A | 3/2021 |
| WO | 2018100725 A1 | 6/2018 |

\* cited by examiner

VEHICLE CONTROL DEVICE, MEDIUM FOR STORING COMPUTER PROGRAM FOR VEHICLE CONTROL, AND METHOD FOR CONTROLLING VEHICLE

FIELD

The present disclosure relates to a vehicle control device, to a medium that stores a computer program for vehicle control, and to a method for controlling a vehicle.

BACKGROUND

An automatic control system mounted in a vehicle creates a navigation route for the vehicle based on the current location of the vehicle, the destination location of the vehicle, and a navigation map. The automatic control system estimates the current location of the vehicle using the map information and controls the vehicle to travel along the navigation route. The automatic control system also controls operation of the vehicle, including its movement between traffic lanes.

When the automatic control system has determined that driving of the vehicle by automatic control is difficult, the automatic control system notifies the driver of a control transfer request to transfer driving of the vehicle from automatic control to manual control. The driver, after having received the notification, performs an operation to acknowledge the control transfer request, and manual control of the vehicle begins (see International Patent Publication No. 2018/100725, for example).

SUMMARY

Depending on the road conditions, after branching to a branching road from the road on which the vehicle is traveling, a zone may exist in which the automatic control system makes a request to transfer control to the driver. In this case, the automatic control system notifies the driver of control transfer immediately after movement from the road on which the vehicle is traveling to the branching road.

However, when the driver is notified of a control transfer request immediately after having moved from the road on which the vehicle is traveling to the branching road, there is not ample time to assess the conditions surrounding the vehicle and it may not be possible to properly operate the vehicle by manual control.

It is therefore an object of the present disclosure to provide a vehicle control device that, when the driver is expected to be notified of a control transfer request to transfer driving of the vehicle from automatic control to manual control after having moved from the road on which the vehicle is traveling to a branching road, gives the driver a notification beforehand that the vehicle is to be controlled by manual control.

One embodiment of the invention provides a vehicle control device. The vehicle control device has a branching assessment unit that determines whether or not there exists a branching location where the vehicle is to exit from a traveling road on which the vehicle is traveling onto a branching road in a predetermined driving zone of a navigation route, based on the current location of the vehicle, the navigation route and map information, a control transfer assessment unit that determines whether or not a control transfer request zone exists in which the driver is to be given a request to transfer driving of the vehicle from automatic control to manual control, within a first distance on the branching road from the branching location, or a second distance on the traveling road from the branching location in the traveling direction of the vehicle, when a branching location exists, and a notification control unit that notifies the driver via a notification unit via a notification device that the vehicle is to be moved from the traveling road to the branching road by manual control before the vehicle reaches the branching location, when the control transfer request zone exists.

This vehicle control device preferably has a first manual control request zone setting unit that sets an area from a location at a third distance before the branching location to the branching location to be a manual control request zone in which the driver is to be requested to move from the traveling road to the branching road by manual control, when the control transfer request zone exists on the branching road.

This vehicle control device also preferably has a first control transfer zone setting unit that sets an area from a location at a fourth distance before the branching location to the branching location to be the control transfer request zone, when the control transfer request zone exists on the branching road.

The vehicle control device preferably also has a second manual control request zone setting unit that sets an area from a location at a fifth distance before the branching location to the branching location to be a manual control request zone in which the driver is to be requested to move from the traveling road to the branching road by manual control, when the control transfer request zone exists on the traveling road.

This vehicle control device also preferably has a second control transfer zone setting unit that sets an area from a location at a sixth distance before the branching location to the branching location to be the control transfer request zone, when the control transfer request zone exists on the traveling road.

According to another embodiment, a computer-readable, non-transitory medium storing a computer program for vehicle control is provided. The computer program causes a processor to execute a process, the process having determining whether or not there exists a branching location where the vehicle is to exit from a traveling road on which the vehicle is traveling onto a branching road in a predetermined driving zone of a navigation route, based on the current location of the vehicle, the navigation route and map information, determining whether or not a control transfer request zone exists in which the driver is to be given a request to transfer driving of the vehicle from automatic control to manual control, within a first distance on the branching road from the branching location, or a second distance on the traveling road from the branching location in the traveling direction of the vehicle, when a branching location exists, and notifying the driver via a notification device that the vehicle is to be moved from the traveling road to the branching road by manual control before the vehicle reaches the branching location, when the control transfer request zone exists.

Another embodiment of the invention provides a method for controlling a vehicle carried out by a vehicle control device. The method for controlling a vehicle has determining whether or not there exists a branching location where the vehicle is to exit from a traveling road on which the vehicle is traveling onto a branching road in a predetermined driving zone of a navigation route, based on the current location of the vehicle, the navigation route and map information, determining whether or not a control transfer request zone exists in which the driver is to be given a request to transfer driving of the vehicle from automatic control to manual control, within a first distance on the branching road from the branching location, or a second distance on the traveling road from the branching location in the traveling direction of the vehicle, when a branching location exists, and notifying the driver via a notification device that the vehicle is to be moved from the traveling road to the branching road by manual control before the vehicle reaches the branching location, when the control transfer request zone exists.

The vehicle control device of the present disclosure gives the driver a notification beforehand that the vehicle is to be controlled by manual control, when the driver is expected to be notified of a control transfer request to transfer driving of the vehicle from automatic control to manual control after having moved from the road on which the vehicle is traveling to a branching road, thus allowing the driver to properly operate the vehicle by manual control.

The object and advantages of the invention will be realized and attained by means of the elements and combinations particularly pointed out in the claims. It is to be understood that both the foregoing general description and the following detailed description are exemplary and explanatory and are not restrictive of the invention, as claimed

DESCRIPTION OF EMBODIMENTS

Figure 1:
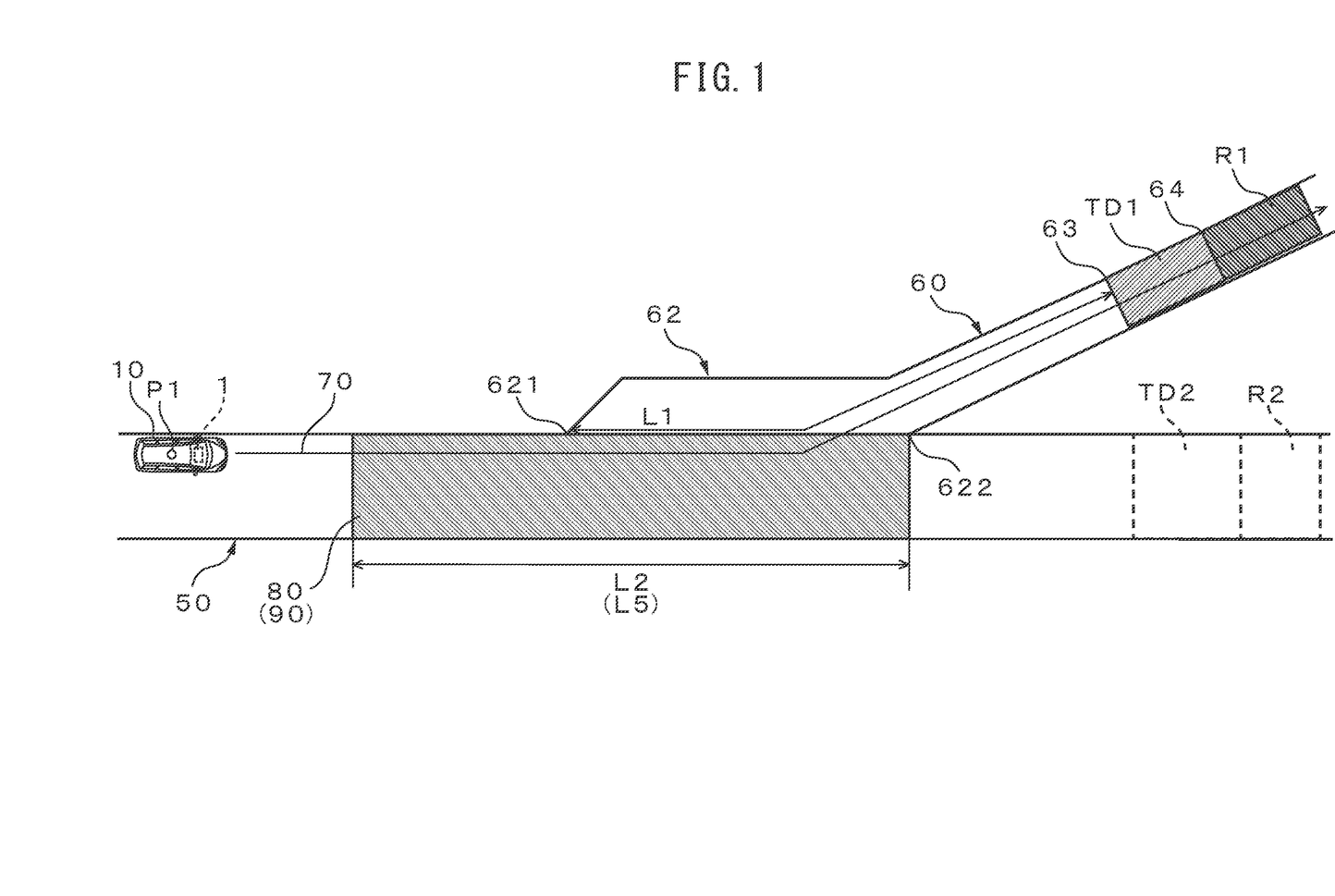
FIG. 1 is a diagram illustrating in overview the operation of a vehicle control system according to a first embodiment.

FIG. 1 is a diagram illustrating in overview the operation of a vehicle control system 1 according to the first embodiment. Operation relating to vehicle control processing by the vehicle control system 1 disclosed herein will now be described in overview with reference to FIG. 1. The vehicle control system 1 is an example of a vehicle control device.

FIG. 1 shows an example of a navigation route 70 generated by a vehicle control system 1 mounted in an automatically controlled vehicle 10. The automatically controlled vehicle 10 is traveling on a road 50 at a current location P1 and is expected to exit to a branching road 60 at a branching location 62. The road 50 and the branching road 60 are connected between a branching start location 621 and a branching end location 622, in a manner such that the vehicle 10 is able to move between them.

The vehicle control system 1 determines that a branching location 62 exists where the vehicle 10 will exit from the road 50 in which it is traveling to the branching road 60, within the nearest driving zone of the navigation route 70, based on the current location of the vehicle P1, the navigation route 70 and the map information.

A control transfer request zone TD1 exists, where the driver is to be requested to transfer all driving of the vehicle 10 from automatic control to manual control, at a distance L1 on the branching road 60 from the branching start location 621, in the traveling direction of the vehicle 10. The control transfer request zone TD1 is located before an automatic control prohibited region R1 where the vehicle control system 1 cannot operate the vehicle by automatic control.

On the branching road 60, the control transfer request zone TD1 is at a distance L1 at equal to or less than a first reference distance from the branching start location 621. The first reference distance is a distance such that any distance greater than the distance is thought to allow the driver to have ample time to acknowledge the control transfer request and begin manual control of the vehicle 10 even if the driver is notified of the control transfer request on the branching road 60 after movement of the vehicle 10 between roads by automatic control has been completed.

If the control transfer request zone TD1 is at equal to or less than the first reference distance from the branching start location 621, then the driver may not have ample time within the control transfer request zone TD1 to acknowledge the control transfer request to begin manual control of the vehicle 10.

The vehicle control system 1 therefore sets an area from a location at distance L2 before the branching end location 622 up to the branching end location 622, to be a manual control request zone 80 where the driver is to be requested to move from the road 50 to the branching road 60 by manual control. In the manual control request zone 80, the vehicle control system 1 prohibits the vehicle 10 from exiting to the branching road 60 from the road 50 by automatic control.

In the manual control request zone 80, the vehicle control system 1 notifies the driver of a movement request for moving the vehicle 10 from the road 50 to the branching road 60 by manual control.

The driver manually controls at least steering of the vehicle 10 in the manual control request zone 80, causing the vehicle 10 to move from the road 50 to the branching road 60. After the driver has moved the vehicle 10 from the road 50 to the branching road 60, the driver is also notified of a control transfer request to transfer all driving of the vehicle 10 from automatic control to manual control, in the control transfer request zone TD1.

Since the vehicle control system 1 notifies the driver in advance that the vehicle 10 is to be controlled by manual control, the driver can transfer all driving of the vehicle 10 from automatic control to manual control to properly operate the vehicle 10 by manual control. After the driver has transferred all driving of the vehicle 10 in the control transfer request zone TD1 from automatic control to manual control, the vehicle 10 is driven by manual control in the automatic control-prohibited zone R1 as well.

The vehicle control system 1 may also set an area from a location at distance L5 before the branching end location 622 up to the branching end location 622, as a control transfer request zone 90 instead of the manual control request zone. In the control transfer request zone 90, the vehicle control system 1 notifies the driver of a movement request for moving the vehicle 10 from the road 50 to the branching road 60 by manual control. In the control transfer request zone 90, the vehicle control system 1 prohibits the vehicle 10 from exiting to the branching road 60 from the road 50 by automatic control. After the vehicle control system 1 has transferred all driving of the vehicle 10 from automatic control to manual control in the control transfer request zone 90, the driver controls the vehicle 10 manually to move the vehicle 10 from the road 50 to the branching road 60.

When a control transfer request zone TD2 exists within the second reference distance on the road 50 from the branching start location 621 in the traveling direction of the vehicle 10, the vehicle control system 1 sets a manual control request zone or control transfer request zone before the branching end location 622. In the manual control request zone or control transfer request zone, the vehicle control system 1 notifies the driver of a movement request for moving the vehicle 10 from the road 50 to the branching road 60 by manual control. The driver thus manually controls at least steering of the vehicle 10 in the manual control request zone or control transfer request zone, to attempt to move the vehicle 10 from the road 50 to the branching road 60. For example, the driver is notified beforehand that the vehicle 10 will be controlled by manual control even if the driver has failed to move the vehicle 10 from the road 50 to the branching road 60. The driver can therefore transfer all driving of the vehicle 10 from automatic control to manual control in the control transfer request zone TD2, allowing the vehicle 10 to be properly driven by manual control in the automatic control-prohibited zone R2.

Figure 2:
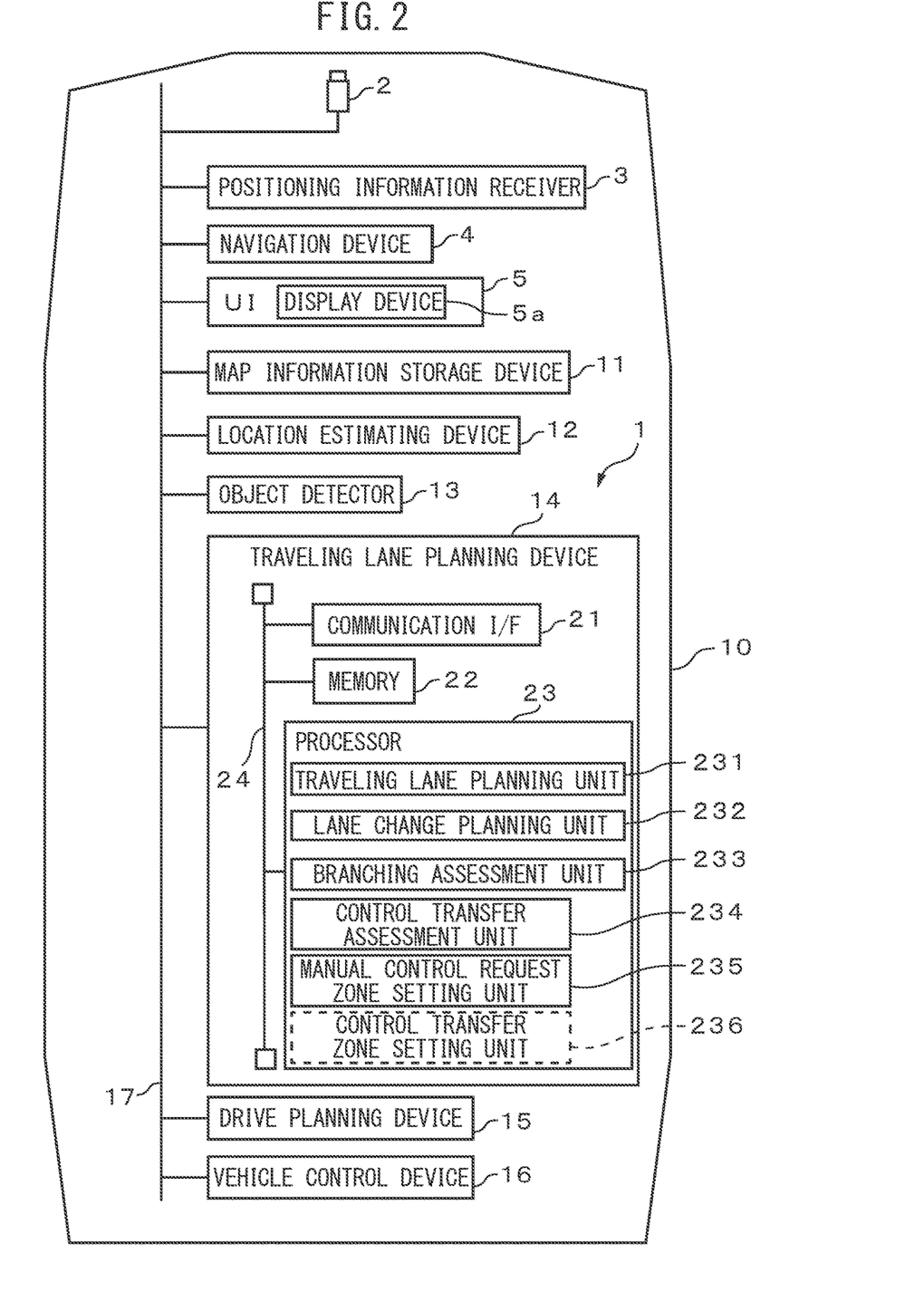
FIG. 2 is a general schematic drawing of a vehicle in which the vehicle control system of the first embodiment is mounted.

FIG. 2 is a general schematic drawing of a vehicle 10 in which the vehicle control system 1 is mounted. The vehicle 10 has a camera 2, a positioning information receiver 3, a navigation device 4, a user interface (UI) 5, a map information storage device 11, a location estimating device 12, an object detector 13, a traveling lane planning device 14, a drive planning device 15 and a vehicle control device 16. The vehicle 10 may also have a LiDAR sensor, as a distance sensor (not shown) for measurement of the distance of the vehicle 10 to surrounding objects.

The camera 2, positioning information receiver 3, navigation device 4, UI 5, map information storage device 11, location estimating device 12, object detector 13, traveling lane planning device 14, drive planning device 15 and vehicle control device 16 are connected in a communicable manner through an in-vehicle network 17 that conforms to controller area network standards.

The camera 2 is an example of an imaging unit provided in the vehicle 10. The camera 2 is mounted inside the vehicle 10 and directed toward the front of the vehicle 10. The camera 2, for example, takes a camera image in which the environment of a predetermined region ahead of the vehicle 10 is shown, at a predetermined cycle. The camera image can show the road in the predetermined region ahead of the vehicle 10, and road features such as surface lane marking lines on the road. The camera 2 has a 2D detector composed of an array of photoelectric conversion elements with visible light sensitivity, such as a CCD or C-MOS, and an imaging optical system that forms an image of the photographed region on the 2D detector.

Each time a camera image is taken, the camera 2 outputs the camera image and the camera image photograph time at which the camera image was taken, through the in-vehicle network 17 to the location estimating device 12 and object detector 13. The camera image is also used for processing at the location estimating device 12 to estimate the location of the vehicle 10. At the object detector 13, the camera image is used for processing to detect other objects surrounding the vehicle 10.

The positioning information receiver 3 outputs positioning information that represents the current location of the vehicle 10. The positioning information receiver 3 may be a GNSS receiver, for example. The positioning information receiver 3 outputs positioning information and the positioning information acquisition time at which the positioning information has been acquired, to the navigation device 4 and map information storage device 11, etc., each time positioning information is acquired at a predetermined receiving cycle.

Based on the navigation map information, the destination location of the vehicle 10 input through the UI 5, and positioning information representing the current location of the vehicle 10 input from the positioning information receiver 3, the navigation device 4 creates a navigation route 70 from the current location to the destination location of the vehicle 10. The navigation route 70 includes information relating to the locations of right turns, left turns, merging and branching. When the destination location has been newly set or the current location of the vehicle 10 has exited the navigation route 70, the navigation device 4 creates a new navigation route 70 for the vehicle 10. Every time a navigation route 70 is created, the navigation device 4 outputs the navigation route 70 to the location estimating device 12 and the traveling lane planning device 14, etc., via the in-vehicle network 17.

The UI 5 is an example of the notification device. The UI 5, controlled by the navigation device 4 and vehicle control device 16, etc., notifies the driver of the vehicle 10 traveling information, the control transfer request or the movement request, etc. The UI 5 also creates an operation signal in response to operation of the vehicle 10 by the driver. The traveling information of the vehicle 10 includes information relating to the current location of the vehicle and the current and future route of the vehicle, such as the navigation route. The UI 5 has a display device 5a such as a liquid crystal display or touch panel, for display of the traveling information. The UI 5 may also have an acoustic output device (not shown) to notify the driver of traveling information. The UI 5 also has a touch panel or operating button, for example, as an input device for inputting operation information from the driver to the vehicle 10. The operation information may be, for example, a destination location, transit points, vehicle speed control transfer request acknowledgement, or other control information for vehicles 10. The UI 5 outputs the input operation information to the navigation device 4 and the vehicle control device 16, via the in-vehicle network 17.

The map information storage device 11 stores wide-area map information for a relatively wide area (an area of 10 to 30 km$^2$, for example) that includes the current location of the vehicle 10. The map information preferably has high precision map information including three-dimensional information for the road surface, information for the types and locations of structures and road features such as road lane marking lines, and the legal speed limit for the road. The map information storage device 11 receives the wide-area map information from an external server via a base station, by wireless communication through a wireless communication device (not shown) mounted in the vehicle 10, in relation to the current location of the vehicle 10, and stores it in the storage device. Each time the positioning information is input from the positioning information receiver 3, the map information storage device 11 refers to the stored wide-area map information and outputs map information for a relatively narrow area including the current location represented by the positioning information (for example, an area of 100 m² to 10 km²), through the in-vehicle network 17 to the location estimating device 12, object detector 13, traveling lane planning device 14, drive planning device 15 and vehicle control device 16, etc.

The location estimating device 12 estimates the location of the vehicle 10 at the camera image photograph time, based on the road features surrounding the vehicle 10 represented in the camera image. For example, the location estimating device 12 compares lane marking lines identified in the camera image with lane marking lines represented in the map information input from the map information storage device 11, and determines the estimated location and estimated declination of the vehicle 10 at the camera image photograph time. The location estimating device 12 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the camera image photograph time, the location estimating device 12 outputs this information to the object detector 13, traveling lane planning device 14, drive planning device 15 and vehicle control device 16, etc.

The object detector 13 detects other objects around the vehicle 10 and their types (for example, vehicles) based on the camera image, for example. Other objects also include other vehicles traveling around the vehicle 10. The object detector 13 tracks other detected objects and determines the trajectories of the other objects. In addition, the object detector 13 identifies the traveling lanes in which the other objects are traveling, based on the lane marking lines represented in the map information and the locations of the objects. The object detector 13 outputs object detection information which includes information representing the types of other objects that were detected, information indicating their locations, and also information indicating their traveling lanes, to the traveling lane planning device 14 and drive planning device 15, etc.

At a traveling lane-planning creation time set in a predetermined cycle, the traveling lane planning device 14 selects a traffic lane on the road on which the vehicle 10 is traveling, within the nearest driving zone (for example, 10 km) selected from the navigation route, based on the map information, the navigation route and surrounding environment information and the current location of the vehicle 10, and creates a traveling lane plan representing the scheduled traveling lane for traveling of the vehicle 10. For example, the traveling lane planning device 14 creates a traveling lane plan for the vehicle 10 to travel on a traffic lane other than a passing traffic lane. Each time a traveling lane plan is created, the traveling lane planning device 14 outputs the drive planning device 15 of the traveling lane plan.

The traveling lane planning device 14 also determines whether or not a lane change is necessary within the nearest driving zone selected from the navigation route 70, based on the traveling lane plan, the map information, the navigation route 70 and the current location of the vehicle 10, and generates a lane change plan in accordance with the assessment results. Specifically, the traveling lane planning device 14 determines whether or not a lane change is necessary for moving to a traffic lane toward the destination location of the vehicle 10, based on the navigation route 70 and the current location of the vehicle 10. It is determined whether or not the vehicle 10 is approaching another road that merges ahead from the traveling road on which it is currently traveling (merge), or the vehicle 10 is exiting onto another road branching out ahead from the traveling road (branch). Since merging and branching involve movement of the vehicle from a lane of the traveling road to a lane in another road, a lane change is carried out. The traveling lane planning device 14 may further utilize surrounding environment information or vehicle status information to determine whether or not a lane change is necessary. The surrounding environment information includes the locations and speeds of other vehicles traveling around the vehicle 10. The vehicle status information includes the current location of the vehicle 10, and the vehicle speed, acceleration and traveling direction. The traveling lane planning device 14 also generates a lane change plan in response to a driver request. When a lane change plan has been generated, the traveling lane planning device 14 outputs the traveling lane plan with the added lane change plan to the drive planning device 15.

The traveling lane planning device 14 also determines whether or not a branching location exists within the nearest driving zone, where the vehicle 10 is to exit from the traveling road in which it is traveling onto a branching road. When a branching location exists, the traveling lane planning device 14 determines whether or not a control transfer request zone exists within the first reference distance on the branching road from the branching location or within the second reference distance on the traveling road from the branching location, where the driver is to be requested to transfer operation of the vehicle 10 from automatic control to manual control. When a control transfer request zone exists on a branching road, the traveling lane planning device 14 sets an area from a location at a predetermined distance before the branching location to the branching location to be a manual control request zone in which the driver is to be requested to move from the traveling road to the branching road by manual control. The traveling lane planning device 14 also adds to the traveling lane plan an operation to notify the driver of a movement request for moving the vehicle 10 from the traveling road to the branching road by manual control, in the manual control request zone. The traveling lane planning device 14 comprises a communication interface (IF) 21, a memory 22 and a processor 23 for this purpose. The communication interface 21, memory 22 and processor 23 are connected via signal wires 24. The communication interface 21 has an interface circuit to connect the traveling lane planning device 14 with the in-vehicle network 17.

All or some of the functions of the traveling lane planning device 14 are functional modules driven by a computer program operating on the processor 23, for example. The processor 23 has a traveling lane planning unit 231, a lane change planning unit 232, a branching assessment unit 233, a control transfer assessment unit 234 and a manual control request zone setting unit 235. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit. The memory 22 is an example of a memory unit, and it has a volatile semiconductor memory and a non-volatile semiconductor memory, for example. The memory 22 stores an application computer program and various data to be used for information processing carried out by the processor 23. The traveling lane planning unit 231 generates the aforementioned traveling lane plan while the lane change planning unit 232 generates the aforementioned lane change plan. Other details regarding operation of the traveling lane planning device 14 are described below.

At a driving plan creation time set with a predetermined cycle, the drive planning device 15 carries out driving plan processing in which it creates a driving plan representing the scheduled traveling trajectory of the vehicle 10 up until a predetermined time (for example, 5 seconds), based on the traveling lane plan, the map information, the current location of the vehicle 10, the surrounding environment information and the vehicle status information. The driving plan is represented as a combination of the target location of the vehicle 10 and the target vehicle speed at the target location, at each time from the current time until the predetermined time. The cycle in which the driving plan is created is preferably shorter than the cycle in which the traveling lane plan is created. The drive planning device 15 generates a driving plan to maintain a spacing of at least a predetermined distance between the vehicle 10 and other vehicles. When the traveling lane plan includes a lane change wherein the vehicle 10 is to move between lanes, but a spacing of at least a predetermined distance cannot be ensured between the vehicle 10 and another vehicle, the drive planning device 15 generates a driving plan for stopping the vehicle 10. The drive planning device 15 outputs the driving plan to the vehicle control device 16 for each driving plan generated.

When the vehicle 10 is operated by automatic control, the vehicle control device 16 controls each unit of the vehicle 10 based on the current location of the vehicle 10 and the vehicle speed and yaw rate, as well as on the driving plan generated by the drive planning device 15. For example, the vehicle control device 16 determines the steering angle, acceleration and angular acceleration of the vehicle 10 according to the driving plan and the speed and yaw rate of the vehicle 10, and sets the amount of steering, and the accelerator or brake level so as to match that steering angle, accelerator level and angular acceleration. The vehicle control device 16 also outputs a control signal corresponding to a set steering amount, to an actuator (not shown) that controls the steering wheel for the vehicle 10, via the in-vehicle network 17. The vehicle control device 16 also determines the amount of fuel injection according to a set accelerator level, and outputs a control signal corresponding to the amount of fuel injection to a drive unit (not shown) of the engine of the vehicle 10, via the in-vehicle network 17. Alternatively, the vehicle control device 16 may output a control signal corresponding to a set brake level to the brake (not shown) of the vehicle 10, via the in-vehicle network 17. When the vehicle 10 is operated by manual control, the vehicle control device 16 controls the steering wheel, drive unit or brake according to the amount of driver-operated steering, accelerator or brake level.

For FIG. 2, the map information storage device 11, location estimating device 12, object detector 13, traveling lane planning device 14, drive planning device 15 and vehicle control device 16 were explained as separate devices, but all or some of them may be constructed in a single device.

Figure 3:
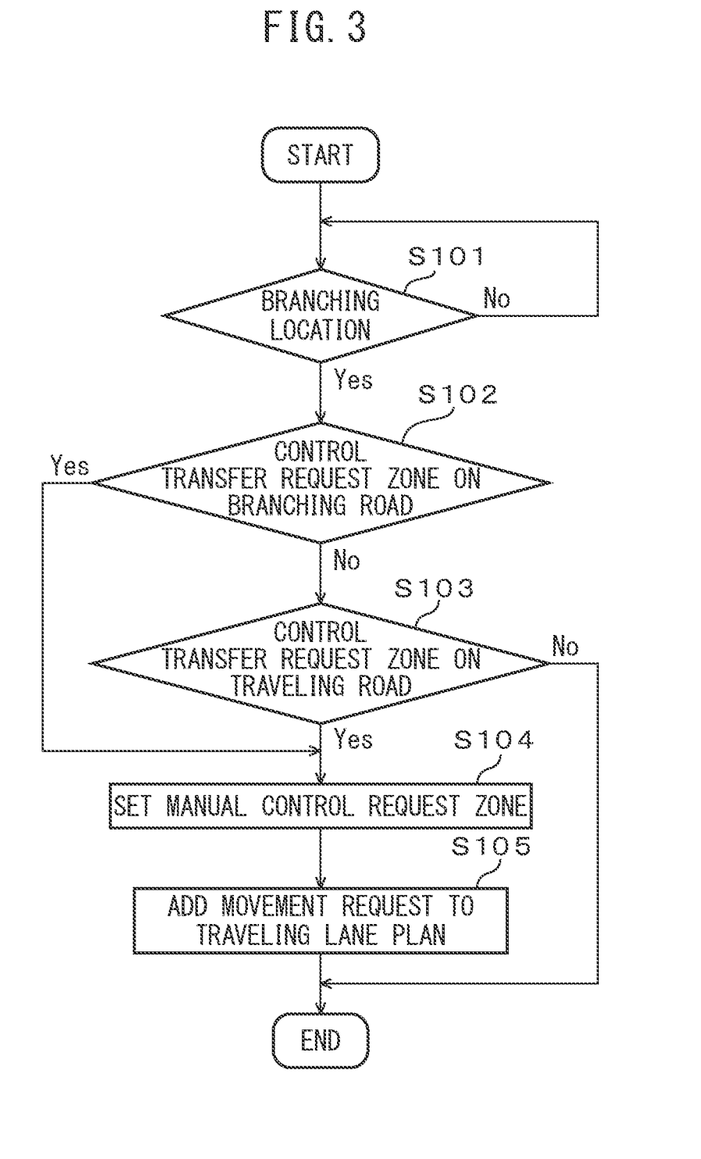
FIG. 3 is an example of an operation flow chart for vehicle control processing by the vehicle control system of the first embodiment.

FIG. 3 is an example of an operation flow chart for vehicle control processing by the vehicle control system 1 of the first embodiment. Vehicle control processing by the vehicle control system 1 will be described below with reference to FIG. 3. The traveling lane planning device 14 carries out vehicle control processing according to the operation flow chart shown in FIG. 3, at a branch assessment time having a predetermined cycle.

The branching assessment unit 233 first determines whether or not a branching location exists where the vehicle 10 will exit from the traveling road in which it is traveling onto a branching road, within the nearest driving zone of the navigation route, based on the current location of the vehicle 10, the navigation route and the map information (step S101).

When a branching location exists (step S101—Yes), the control transfer assessment unit 234 determines whether or not a control transfer request zone exists in which the driver is to be requested to transfer all driving of the vehicle 10 from automatic control to manual control, within the first reference distance on the branching road from the branching location in the traveling direction of the vehicle 10 (step S102). In the control transfer request zone, the driver is given a request to transfer all driving including steering, engine actuation and braking, from automatic control to manual control. The branching location used may be the branching start location, the branching end location, or any location between the branching start location and branching end location (for example, the midpoint between the branching start location and branching end location).

When a control transfer request zone exists on the branching road (step S102—Yes), the manual control request zone setting unit 235 sets on the traveling road an area from a location at a predetermined distance before the branching location to the branching location to be a manual control request zone in which the driver is to be requested to move from the traveling road to the branching road by manual control (step S104). Within the manual control request zone, the manual control request zone setting unit 235 prohibits the vehicle 10 from exiting from the traveling road to the branching road by automatic control at the branching location.

The manual control request zone setting unit 235 then adds to the traveling lane plan an operation to notify the driver of a movement request for moving the vehicle 10 from the traveling road to the branching road by manual control, in the manual control request zone (step S105), thus completing the series of steps.

When no control transfer request zone exists on the branching road (step S102—No), the control transfer assessment unit 234 determines whether or not a control transfer request zone exists in which the driver is to be requested to transfer all driving of the vehicle 10 from automatic control to manual control, within the second reference distance on the traveling road from the branching location in the traveling direction of the vehicle 10 (step S103).

When a control transfer request zone exists on the traveling road (step S103—Yes), the traveling lane planning device 14 carries out the operation from step S104 to step S105 above, thus completing the series of steps.

When a branching location does not exist (step S101—No), the branching assessment unit 233 proceeds to step S101 and waits until the next branch assessment time. When no control transfer request zone exists on the traveling road (step S103—No), the series of processing steps is complete.

The traveling lane planning device 14 does not need to carry out the processing shown in FIG. 3 for a branching location for which it has already carried out branch assessment processing.

An operating example of the vehicle control system 1 will now be further explained with reference to FIGS. 4 to 6.

Figure 4:
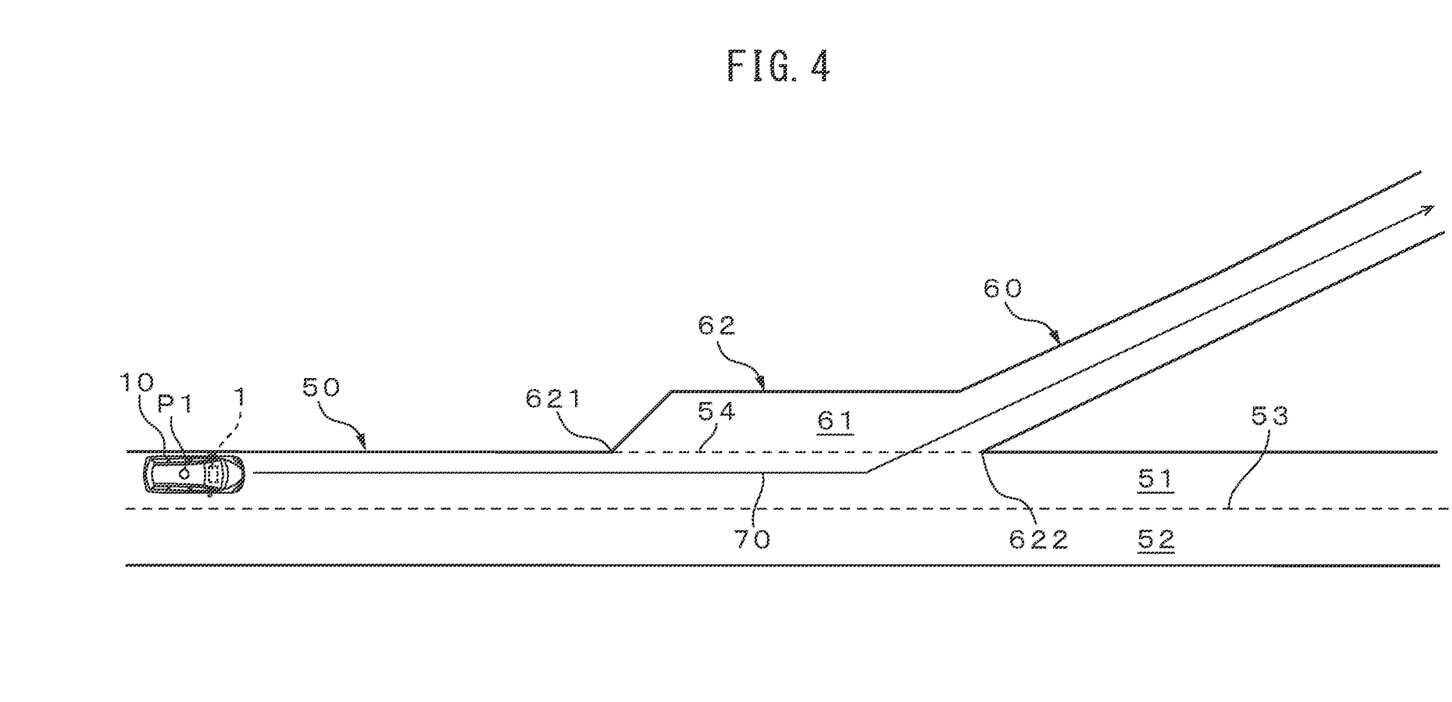
FIG. 4 is a diagram showing an example of a navigation route.

FIG. 4 shows an example of a navigation route 70 input from a navigation device 4. The example shown in FIG. 4 corresponds to FIG. 1, and the navigation route 70 shows the vehicle 10 exiting onto a branching road 60 at a branching location 62 after it has traveled on a road 50.

The vehicle 10 is traveling on one traffic lane 51 of a road 50 having traffic lanes 51, 52. The traffic lane 51 and traffic lane 52 are divided by a lane marking line 53. The traffic lane 51 of the road 50 and the traffic lane 61 of the branching road 60 are connected at the branching location 62 between a branching start location 621 and a branching end location 622, in a manner allowing movement of the vehicle 10.

Figure 5:
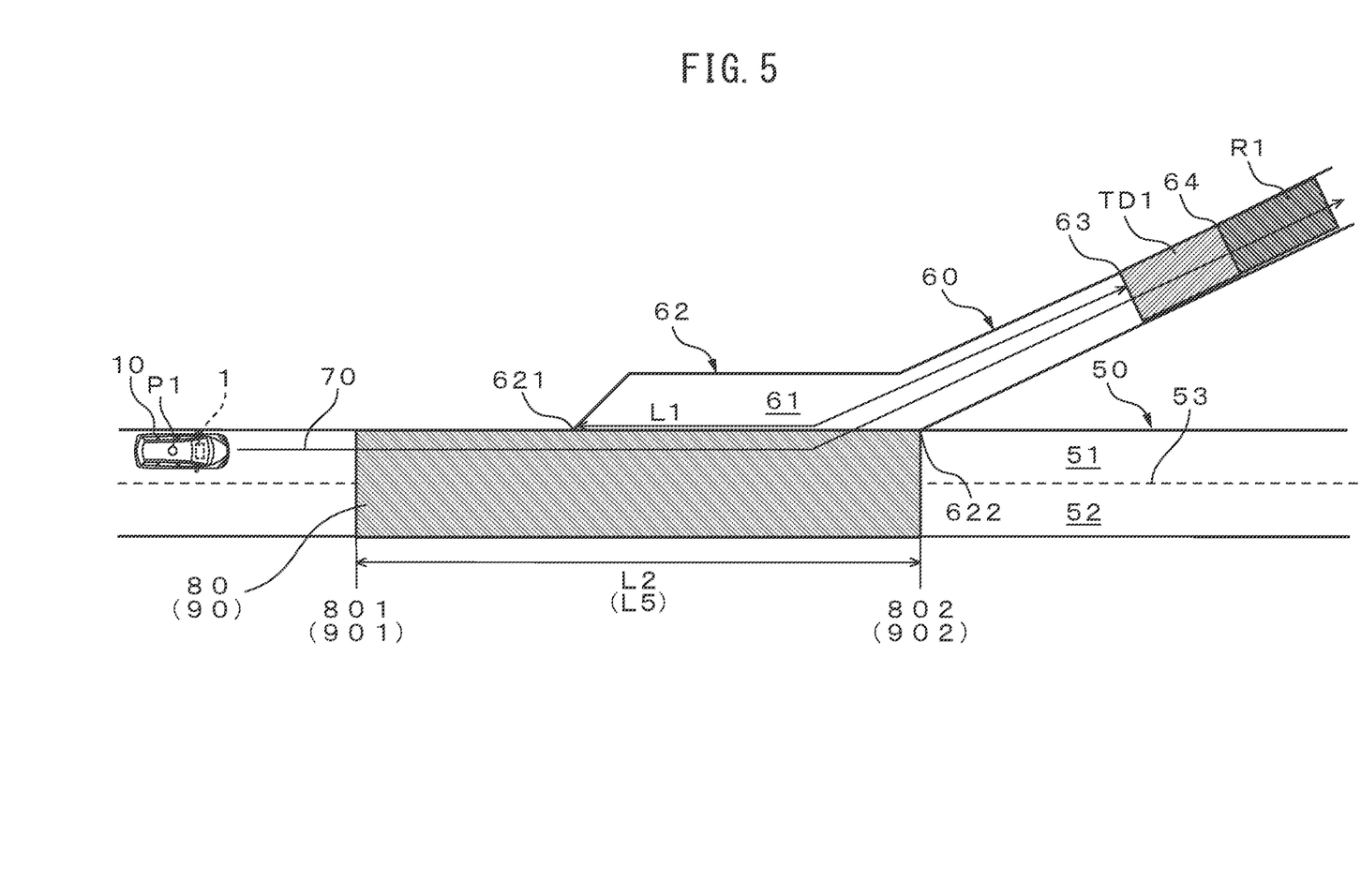
FIG. 5 is a diagram illustrating an example of vehicle control processing when a control transfer request zone exists on a branching road.

FIG. 5 is a diagram illustrating an example of vehicle control processing when a control transfer request zone exists on a branching road 60. On the branching road 60, a control transfer request zone TD1 exists at a location at distance L1 from the branching start location 621, in the traveling direction of the vehicle 10. Distance L1 is a distance within the first reference distance. The control transfer request zone TD1 is a zone between the start location 63 and the end location 64 of the branching road 60.

The control transfer request zone TD1 is located before an automatic control prohibited region R1 where the vehicle control system 1 cannot operate the vehicle by automatic control. The automatic control prohibited region R1 may be a region with terrain that does not allow easy vehicle operation control by the vehicle control system 1, a region not represented in the high precision map, or a region temporarily prohibited from vehicle travel by automatic control. A region with terrain that does not allow vehicle operation to be safely controlled by the vehicle control system 1 may be terrain with a curve having a large curvature radius, terrain with a large slope, terrain that includes road markings such as stop lines, terrain that includes an intersection, terrain that includes a bus stop, terrain where a branching road merges with another road and the merge zone for merging with the other road is short, terrain where the road is too narrow to allow safe control of vehicle operation by the vehicle control system 1, or terrain wide enough to allow parallel travel of multiple vehicles but without lane marking lines. A region not represented in the high precision map may be a region ahead of a toll gate on an automobile road, or a service area or parking area. A region temporarily prohibited from vehicle travel by automatic control may be a construction zone or a region flagged with a falling object warning.

The automatic control prohibited region R1 and control transfer request zone TD1 are registered in the map information. When only the automatic control prohibited region is registered in the map information and the control transfer request zone is not registered, the traveling lane planning device 14 may set the control transfer request zone before the automatic control prohibited region based on the automatic control prohibited region registered in the map information.

A branching location 62 exists within the nearest driving zone of the navigation route 70, and a control transfer request zone TD1 exists at equal to or less than the first reference distance (distance L1) on the branching road 60 from the branching start location 621 in the traveling direction of the vehicle 10. The first reference distance is a distance such that any distance greater than the distance is thought to allow the driver to have ample time to acknowledge the control transfer request and begin manual control of the vehicle 10 even if the driver is notified of the control transfer request on the branching road 60 after movement of the vehicle 10 between roads by automatic control has been completed. The first reference distance can be determined by the product of the most recent average speed of the vehicle 10, and the time estimated to be necessary for the driver to acknowledge the control transfer request with ample time.

When the control transfer request zone TD1 is within the first reference distance from the branching start location 621, the notification of the control transfer request will be made immediately after the vehicle 10 has exited from the road 50 to the branching road 60 at the branching location 62. Therefore, the driver may not have ample time within the control transfer request zone TD1 to acknowledge the control transfer request to begin manual control of the vehicle 10.

The manual control request zone setting unit 235 therefore sets an area from a location 801 at distance L2 before the branching end location 622 up to the branching end location 622 (802), to be a manual control request zone 80 where the driver is to be requested to move from the road 50 to the branching road 60 by manual control. The manual control request zone 80 is a zone between the start location 801 and the end location 802 on the road 50. The distance L2 can be determined by the product of the most recent average speed of the vehicle 10, and the time estimated to give the driver ample time to perform the operation of movement from the road 50 to the branching road 60 by manual control. The end location 802 of the manual control request zone 80 may also be between the branching start location 621 and the branching end location 622. The manual control request zone setting unit 235 prohibits the vehicle 10 from exiting from the traveling road to the branching road by automatic control.

The manual control request zone setting unit 235 then adds to the traveling lane plan an operation to notify the driver of a movement request for moving the vehicle 10 from the road 50 to the branching road 60 by manual control, in the manual control request zone 80. The drive planning device 15 also adds to the driving plan an operation to notify the driver of a movement request in the manual control request zone 80.

The vehicle control device 16 controls the vehicle 10 based on the driving plan. In the manual control request zone 80, the vehicle control device 16, based on the driving plan and by way of the UI 5, notifies the driver of a movement request for moving from the traffic lane 51 of the road 50 to the traffic lane 61 of the branching road 60 by manual control. Operation of the vehicle 10 is in an automatic control state, and the vehicle control device 16 controls the steering wheel, drive unit or brake according to the amount of driver-operated steering, and the accelerator or brake level. In the manual control request zone 80, the driver operates the vehicle 10 by manual control to allow movement from the traffic lane 51 of the road 50 to the traffic lane 61 of the branching road 60, at the branching location 62.

Since the driver is notified in the manual control request zone 80 of the movement request to move the vehicle 10 from the road 50 to the branching road 60 by manual control, the driver can assess the conditions around the vehicle while manually controlling at least steering of the vehicle 10 to move the vehicle 10 from the road 50 to the branching road 60. Immediately after movement from the road 50 on which the vehicle 10 is traveling onto the branching road 60, the driver is notified of a control transfer request to transfer operation of the vehicle 10 from automatic control to manual control, in the control transfer request zone TD1. Since the driver is already driving the vehicle 10 at least partially by manual control for movement from the road 50 to the branching road 60, the vehicle 10 can be properly operated by manual control. After the driver has transferred all driving of the vehicle 10 in the control transfer request zone TD1 from automatic control to manual control, the vehicle 10 is driven by manual control in the automatic control-prohibited zone R1 as well.

Figure 6:
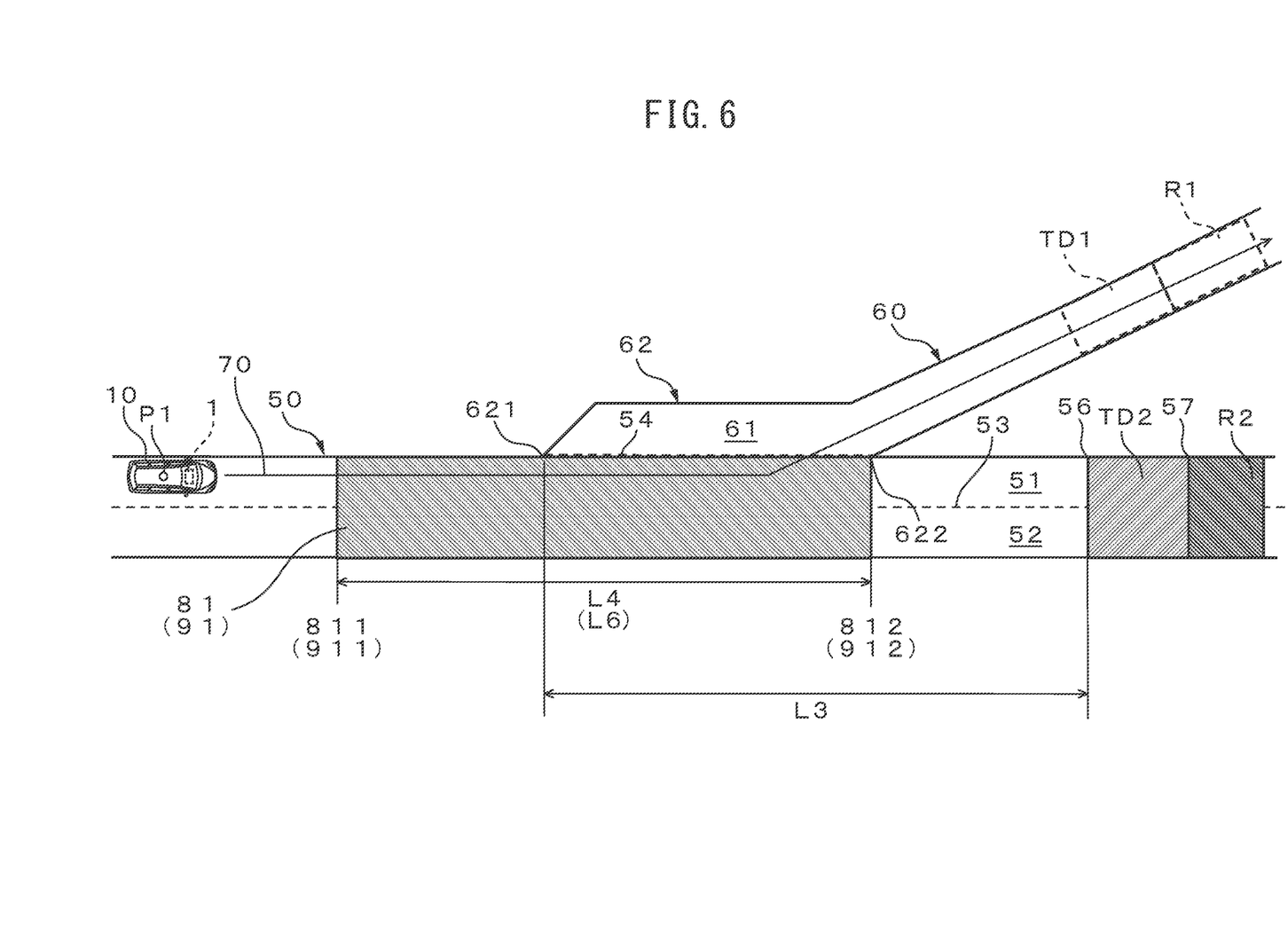
FIG. 6 is a diagram illustrating an example of vehicle control processing when a control transfer request zone exists on the traveling road.

FIG. 6 is a diagram illustrating an example of vehicle control processing when a control transfer request zone exists on a road 50. In the example shown in FIG. 6, a control transfer request zone exists not on the branching road 60, but on the road 50 on which the vehicle 10 is traveling. On the road 50, a control transfer request zone TD2 exists at a location at distance L3 from the branching start location 621, in the traveling direction of the vehicle 10. Distance L3 is a distance within the second reference distance.

The second reference distance is a distance such that any distance greater than the distance is thought to allow the driver to have ample time to acknowledge the control transfer request and begin manual control of the vehicle 10 even if the driver is notified of the control transfer request after failure of the vehicle 10 to move between roads by automatic control, while the vehicle 10 is traveling on the road 50.

The control transfer request zone TD2 is a zone between the start location 56 and the end location 57 of the road 50. The control transfer request zone TD2 is located before an automatic control prohibited region R2 where the vehicle control system 1 cannot operate the vehicle by automatic control. The aforementioned explanation regarding the automatic control prohibited region R1 also applies as appropriate to the automatic control prohibited region R2. The explanation regarding the control transfer request zone TD1 likewise applies as appropriate to the control transfer request zone TD2.

A branching location 62 exists within the nearest driving zone of the navigation route 70, and a control transfer request zone TD2 exists within the second reference distance (distance L3) on the road 50 from the branching start location 621 in the traveling direction of the vehicle 10.

The manual control request zone setting unit 235 therefore sets an area from a location at distance L4 before the branching end location 622 up to the branching end location 622, to be a manual control request zone 81 where the driver is to be requested to move from the road 50 to the branching road 60 by manual control. The manual control request zone 81 is a zone between the start location 811 and the end location 812 of the road 50. The distance L4 can be determined by the product of the most recent average speed of the vehicle 10, and the time estimated to give the driver ample time to perform the operation of transferring driving of the vehicle 10 from automatic control to manual control. The end location 812 of the manual control request zone 81 may also be between the branching start location 621 and the branching end location 622. The manual control request zone setting unit 235 prohibits the vehicle 10 from exiting from the traveling road to the branching road by automatic control.

The manual control request zone setting unit 235 then adds to the traveling lane plan an operation to notify the driver of a movement request for moving the vehicle 10 from the road 50 to the branching road 60 by manual control, in the manual control request zone 81. The drive planning device 15 also adds to the driving plan an operation to notify the driver of a movement request in the manual control request zone 81.

The vehicle control device 16 controls the vehicle 10 based on the driving plan. Since the driver is notified in the manual control request zone 81 of the movement request to move the vehicle 10 from the road 50 to the branching road 60 by manual control, the driver assesses the conditions around the vehicle while attempting to manually control at least steering of the vehicle 10 to move from the road 50 to the branching road 60.

However, when the driver has failed to move the vehicle 10 from the road 50 to the branching road 60 due to the presence of other vehicles or other reasons, the vehicle 10 proceeds along the road 50 past the branching location 62.

The vehicle control device 16 notifies the driver of the control transfer request by way of the UI 5, when the vehicle 10 enters into the control transfer request zone TD2. Since the driver is already driving the vehicle 10 at least partially by manual control while assessing the conditions around the vehicle at the branching location 62, it becomes possible to properly operate the vehicle 10 by manual control in the automatic control-prohibited zone R2 after having acknowledged notification of the control transfer request in the control transfer request zone TD2.

As explained above, the vehicle control device of this embodiment gives the driver a notification beforehand that the vehicle is to be controlled by manual control, when the driver is expected to be notified of a control transfer request to transfer driving of the vehicle from automatic control to manual control after having moved from the road on which the vehicle is traveling to a branching road, thus allowing the driver to properly operate the vehicle by manual control even when notified of the control transfer request. Moreover, the vehicle control device of this embodiment gives the driver a notification beforehand that the vehicle is to be controlled by manual control, when the driver is expected to be notified of a control transfer request to transfer driving of the vehicle from automatic control to manual control on the traveling road, after having passed a branching location where a branching road branches from the road on which the vehicle is traveling, and this allows the driver to properly operate the vehicle by manual control even when notified of the control transfer request.

Processing in step S102 and step S103 in the flow chart shown in FIG. 3 may optionally be carried out in the opposite order. In the example shown in FIG. 6, then, it may be the case that a control transfer request zone TD1 exists on the branching road 60 and a control transfer request zone TD2 also exists on the road 50. It is also possible that the driver may drive the vehicle 10 to exit from the traveling road to the branching road, according to the navigation route 70. As explained in regard to FIG. 5, since the driver is already driving the vehicle 10 at least partially by manual control to move from the road 50 to the branching road 60, it becomes possible to properly operate the vehicle 10 by manual control in the automatic control-prohibited zone R1 after having acknowledged notification of the control transfer request in the control transfer request zone TD1.

A second embodiment of the vehicle control system will now be described with reference to FIG. 7. The explanation of the first embodiment is to be applied for any aspects of the second embodiment that are not explained here.

This embodiment differs from the first embodiment in that the processor 23 of the traveling lane planning device 14 has a control transfer zone setting unit 236 (see FIG. 2) instead of a manual control request zone setting unit. When a control transfer request zone exists on a branching road, the control transfer zone setting unit 236 sets an area from a location at a predetermined distance before the branching location up to the branching location, to be the control transfer request zone. When a control transfer request zone exists on the traveling road, the control transfer zone setting unit 236 sets an area from a location at a predetermined distance before the branching location up to the branching location, to be the control transfer request zone. The control transfer zone setting unit 236 then adds to the traveling lane plan an operation to notify the driver of a movement request for moving the vehicle 10 from the traveling road to the branching road by manual control, in the control transfer request zone.

Figure 7:
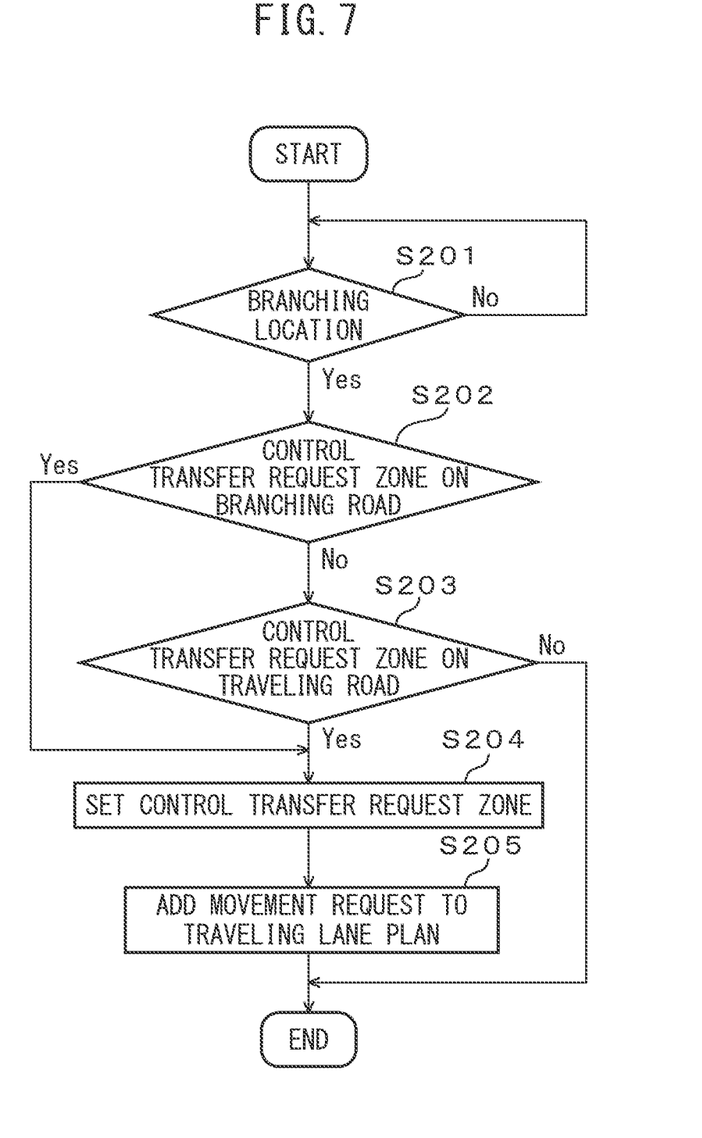
FIG. 7 is an example of an operation flow chart for vehicle control processing by a vehicle control system according to a second embodiment.

FIG. 7 is an example of an operation flow chart for vehicle control processing by the vehicle control system 1 of the second embodiment. Processing in step S204 of this embodiment differs from step S104 of the first embodiment. Operation in steps S201 to S203 and step S205 of this embodiment is the same as steps S101 to S103 and step S105 in the first embodiment described above.

In step S204, when a control transfer request zone exists on a branching road (step S202—Yes), the control transfer zone setting unit 236 sets an area on the traveling road from a location at a predetermined distance before the branching location up to the branching location, to be the control transfer request zone.

When a control transfer request zone exists on the traveling road (step S203—Yes), in step S204, the control transfer zone setting unit 236 sets an area on the traveling road from a location at a predetermined distance before the branching location up to the branching location, to be the control transfer request zone.

Vehicle control processing according to this embodiment will now be explained with reference to FIG. 5. FIG. 5 is a diagram illustrating vehicle control processing when a control transfer request zone exists on a branching road.

A branching location 62 exists within the nearest driving zone of the navigation route 70, and a control transfer request zone TD1 exists within the first reference distance (distance L1) on the branching road 60 from the branching start location 621 in the traveling direction of the vehicle 10. The control transfer zone setting unit 236 therefore sets an area from a location at distance L5 before the branching end location 622 (901) to a branching end location 622 (902), to be a control transfer zone 90 where the driver is to be requested to transfer all driving of the vehicle 10 from automatic control to manual control. The control transfer zone 90 is a zone between the start location 901 and the end location 902 on the road 50. The distance L5 can be determined by the product of the most recent average speed of the vehicle 10, and the time estimated to give the driver ample time to perform the operation of transferring control and the operation of movement from the road 50 to the branching road 60 by manual control. The end location 902 of the control transfer zone 90 may also be between the branching start location 621 and the branching end location 622. The control transfer zone setting unit 236 prohibits the vehicle 10 from exiting from the traveling road to the branching road by automatic control.

The control transfer zone setting unit 236 then adds to the traveling lane plan an operation to notify the driver of a movement request for moving the vehicle 10 from the road 50 to the branching road 60 by manual control, in the control transfer zone 90. The drive planning device 15 also adds to the driving plan an operation to notify the driver of a movement request in the control transfer zone 90.

The vehicle control device 16 controls the vehicle 10 based on the driving plan. In the control transfer zone 90, the vehicle control device 16 gives notification of a control transfer request to transfer operation of the vehicle 10 from automatic control to manual control, by way of the UI 5. When the driver acknowledges the control transfer request via the UI 5, all driving of the vehicle 10 is transferred from automatic control to manual control. In the control transfer zone 90, the vehicle control device 16, based on the driving plan and by way of the UI 5, notifies the driver of a movement request for moving from the traffic lane 51 of the road 50 to the traffic lane 61 of the branching road 60 by manual control. When the vehicle 10 is operated by manual control, the vehicle control device 16 controls the steering wheel, drive unit or brake according to the amount of driver-operated steering, accelerator or brake level. The driver operates the vehicle 10 by manual control to allow movement from the traffic lane 51 of the road 50 to the traffic lane 61 of the branching road 60, at the branching location 62.

Since the driver is notified in the control transfer zone 90 of the movement request to move the vehicle 10 from the road 50 to the branching road 60 by manual control, the driver drives the vehicle 10 by manual control to move the vehicle 10 from the road 50 to the branching road 60. A control transfer request zone TD1 exists immediately after movement from the road 50 on which the vehicle 10 is traveling onto the branching road 60, but since driving of the vehicle 10 has already been transferred to manual control, the driver is not given notification of a control transfer request. The driver can properly operate the vehicle 10 by manual control even after having entered the automatic control-prohibited zone R1.

Vehicle control processing according to this embodiment will now be explained with reference to FIG. 6. FIG. 6 is a diagram illustrating vehicle control processing when a control transfer request zone exists on a road 50.

A branching location 62 exists within the nearest driving zone of the navigation route 70, and a control transfer request zone TD2 exists within the second reference distance (distance L3) on the road 50 from the branching start location 621 in the traveling direction of the vehicle 10. The control transfer zone setting unit 236 therefore sets an area from a location at distance L6 before the branching end location 622 (911) to a branching end location 622 (912), to be a control transfer zone 91 where the driver is to be requested to transfer all driving of the vehicle 10 from automatic control to manual control. The control transfer zone 91 is a zone between the start location 911 and the end location 912 on the road 50. The explanation of distance L5 applies as appropriate to distance L6 as well. The end location 912 of the control transfer zone 91 may also be between the branching start location 621 and the branching end location 622. The control transfer zone setting unit 236 prohibits the vehicle 10 from exiting from the traveling road to the branching road by automatic control.

The control transfer zone setting unit 236 then adds to the traveling lane plan an operation to notify the driver of a movement request for moving the vehicle 10 from the road 50 to the branching road 60 by manual control, in the control transfer zone 91. The drive planning device 15 also adds to the driving plan an operation to notify the driver of a movement request in the control transfer zone 91.

The vehicle control device 16 controls the vehicle 10 based on the driving plan. Since the driver is notified of the movement request to move the vehicle 10 from the road 50 to the branching road 60 by manual control, the driver drives the vehicle 10 by manual control to move the vehicle 10 from the road 50 to the branching road 60. For example, even if the driver has failed to move the vehicle 10 from the road 50 to the branching road 60 due to the presence of other vehicles or other reasons, since the vehicle 10 is already being driven by manual control, the driver is not given notification of a control transfer request in the control transfer request zone TD2. The driver can properly operate the vehicle 10 by manual control even after having entered the automatic control-prohibited zone R2.

As explained above, the vehicle control device of this embodiment gives the driver a notification beforehand that the vehicle is to be controlled by manual control, when the driver is expected to be notified of a control transfer request to transfer driving of the vehicle from automatic control to manual control after having moved from the road on which the vehicle is traveling to a branching road, and consequently the driver is not given notification of the control transfer request again. The driver can also properly operate the vehicle by manual control. Moreover, the vehicle control device of this embodiment gives the driver a notification beforehand that the vehicle is to be controlled by manual control, when the driver is expected to be notified of a control transfer request to transfer driving of the vehicle from automatic control to manual control on the traveling road, after having passed a branching location where a branching road branches from the road on which the vehicle is traveling, and therefore the driver is not given notification of the control transfer request again. The driver can also properly operate the vehicle by manual control.

The vehicle control device, the medium that stores a computer program for vehicle control and the method for controlling a vehicle according to the embodiment described above may incorporate appropriate modifications that are still within the gist of the disclosure. Moreover, the technical scope of the disclosure is not limited to this embodiment, and includes the invention and its equivalents as laid out in the Claims.

For example, for the first embodiment, the control transfer request zone was at a distance from the branching location, but the control transfer request zone may instead be in the branching location. In this case the driver is notified of the control transfer request while moving from the traveling road to the branching road.

Figure 8:
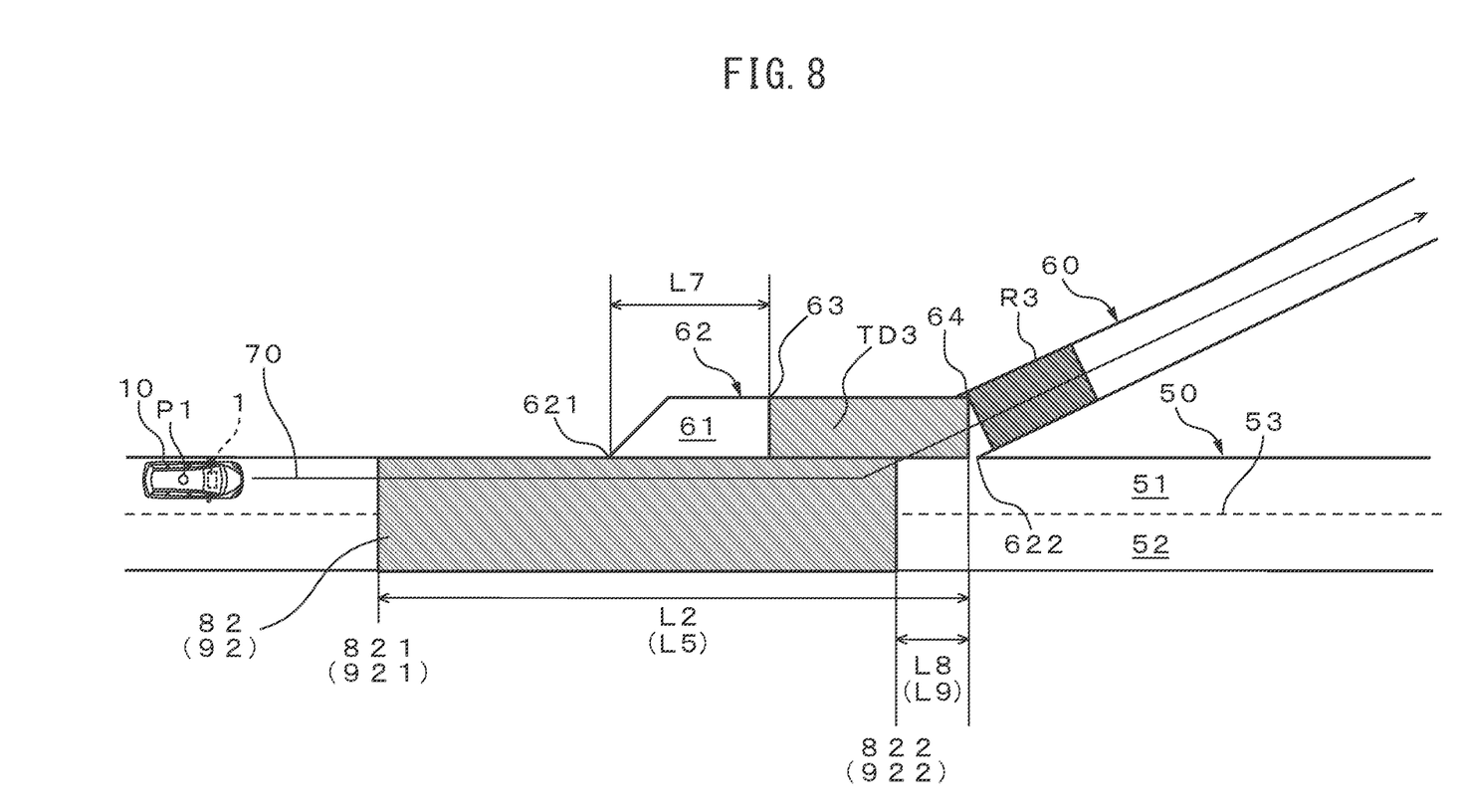
FIG. 8 is a diagram illustrating an example of vehicle control processing when a control transfer request zone exists on a branching road.

FIG. 8 is a diagram illustrating an example of vehicle control processing when a control transfer request zone exists on a branching road. A control transfer request zone TD3 exists in the branching location 62 where the branching road 60 branches from the road 50. The control transfer request zone TD3 is located before the automatic control prohibited region R3. The control transfer request zone TD3 is at a location at distance L7 within the first reference distance from the branching start location 621, in the traveling direction of the vehicle 10. The control transfer request zone TD3 is a zone between the start location 63 and the end location 64 of the branching road 60.

A branching location 62 exists within the nearest driving zone of the navigation route 70, and a control transfer request zone TD3 exists within the first reference distance on the branching road 60 from the branching start location 621 in the traveling direction of the vehicle 10.

The manual control request zone setting unit 235 therefore sets an area from a location 821 at distance L2 before the branching end location 622 up to the end location 822, to be a manual control request zone 82 where the driver is to be requested to move from the road 50 to the branching road 60 by manual control.

First, the manual control request zone setting unit 235 sets the start location 821 of the manual control request zone 82 to be a location at distance L2 before the branching end location 622.

Next, the manual control request zone setting unit 235 sets the end location 822 in the manual control request zone 82 as follows. The manual control request zone setting unit 235 sets the end location 822 in the manual control request zone to be a location from the end location 64 of the control transfer request zone TD3 by distance L8 in the frontside direction, calculated as the product of the most recent average speed of the vehicle 10 and a predetermined time. The predetermined time is preferably set so that the end location 822 is a location between the start location 63 and the end location 64 of the control transfer request zone TD3. For example, the predetermined time may be a value between ⅕ to ½ of the quotient of the distance of the control transfer request zone TD3 divided by the average speed of the vehicle 10.

The manual control request zone setting unit 235 sets the manual control request zone 82 to be the region of the road 50 between the start location 821 and the end location 822.

This will allow the manual control request zone setting unit 235 to set the manual control request zone 82 in a zone before the end location 64 of the control transfer request zone TD3. Since the start location 821 of the manual control request zone 82 is located before the branching start location 621, the driver can properly respond even if given notification of a control transfer request while moving from the road 50 to the branching road 60.

Similarly, the control transfer zone setting unit 236 may set the start location 921 in the control transfer zone to be a location at distance L5 before the branching end location 622. The control transfer zone setting unit 236 sets the end location 922 in the control transfer zone to be a location in the frontside direction by distance L9 from the end location 64 of the control transfer request zone TD3, calculated as the product of the average speed of the vehicle 10 and a predetermined time. The explanation of distance L8 applies as appropriate to distance L9 as well.

The control transfer zone setting unit 236 sets the control transfer zone 92 to be the region between the start location 921 and the end location 922. Since the start location 921 of the control transfer zone 92 is located before the branching start location 621, the driver does not receive notification of a control transfer request while moving from the road 50 to the branching road 60.

This will allow the control transfer zone setting unit 236 to set the control transfer zone 92 in a zone before the end location 64 of the control transfer request zone TD3.

The explanation of FIG. 8 also applies as appropriate when a control transfer request zone exists on the traveling road, and a manual control request zone or control transfer zone is set on the traveling road.

The invention claimed is:

1. A vehicle control device comprising:
   a processor that executes stored computer readable instructions to
   control the vehicle by automatic control;
   determine whether or not there exists a branching location where the vehicle is to exit from a traveling road on which the vehicle is traveling onto a branching road in a predetermined driving zone of a navigation route, based on a current location of the vehicle, a navigation route and map information,
   determine whether or not a control transfer request zone exists in which a driver is to be given a request to transfer driving of the vehicle from automatic control to manual control, within a first distance, the first distance measured from the branching location to the control transfer request zone on the branching road, or within a second distance, the second distance measured from the branching location to the control transfer request zone on the traveling road in a traveling direction of the vehicle, when the branching location exists;

control the vehicle to prevent the vehicle from using automatic control to exit from the traveling road to the branching road at the branching location when the control transfer request zone exists; and notify the driver via a notification device that the vehicle is to be moved from the traveling road to the branching road by manual control before the vehicle reaches the branching location, when the control transfer request zone exists.

2. The vehicle control device according to claim 1, wherein the processor is further configured to set an area from a location at a third distance before the branching location to the branching location to be a manual control request zone in which the driver is to be requested to move from the traveling road to the branching road by manual control, when the control transfer request zone exists on the branching road.

3. The vehicle control device according to claim 1, wherein the processor is further configured to set an area from a location at a fourth distance before the branching location to the branching location to be the control transfer request zone, when the control transfer request zone exists on the branching road.

4. The vehicle control device according to claim 1, wherein the processor is further configured to set an area from a location at a fifth distance before the branching location to the branching location to be a manual control request zone in which the driver is to be requested to move from the traveling road to the branching road by manual control, when the control transfer request zone exists on the traveling road.

5. The vehicle control device according to claim 1, wherein the processor is further configured to set an area from a location at a sixth distance before the branching location to the branching location to be the control transfer request zone, when the control transfer request zone exists on the traveling road.

6. A computer-readable, non-transitory medium storing a computer program for vehicle control, wherein the computer program causes a processor to execute a process, the process comprising:

controlling the vehicle by automatic control;

determining whether or not there exists a branching location where the vehicle is to exit from a traveling road on which the vehicle is traveling onto a branching road in a predetermined driving zone of a navigation route, based on a current location of the vehicle, a navigation route and map information;

determine whether or not a control transfer request zone exists in which a driver is to be given a request to transfer driving of the vehicle from automatic control to manual control, within a first distance, the first distance measured from the branching location to the control transfer request zone on the branching road, or within a second distance, the second distance measured from the branching location to the control transfer request zone on the traveling road in a traveling direction of the vehicle, when the branching location exists;

controlling the vehicle to prevent the vehicle from using automatic control to exit from the traveling road to the branching road at the branching location when the control transfer request zone exists; and notifying the driver via a notification device that the vehicle is to be moved from the traveling road to the branching road by manual control before the vehicle reaches the branching location, when the control transfer request zone exists.

7. A method for controlling a vehicle carried out by a vehicle control device, comprising:

controlling the vehicle by automatic control;

determining whether or not there exists a branching location where the vehicle is to exit from a traveling road on which the vehicle is traveling onto a branching road in a predetermined driving zone of a navigation route, based on a current location of the vehicle, a navigation route and map information;

determine whether or not a control transfer request zone exists in which a driver is to be given a request to transfer driving of the vehicle from automatic control to manual control, within a first distance, the first distance measured from the branching location to the control transfer request zone on the branching road, or within a second distance, the second distance measured from the branching location to the control transfer request zone on the traveling road in a traveling direction of the vehicle, when the branching location exists;

controlling the vehicle to prevent the vehicle from using automatic control to exit from the traveling road to the branching road at the branching location when the control transfer request zone exists; and notifying the driver via a notification device that the vehicle is to be moved from the traveling road to the branching road by manual control before the vehicle reaches the branching location, when the control transfer request zone exists.

* * * * *